Patented Nov. 18, 1947

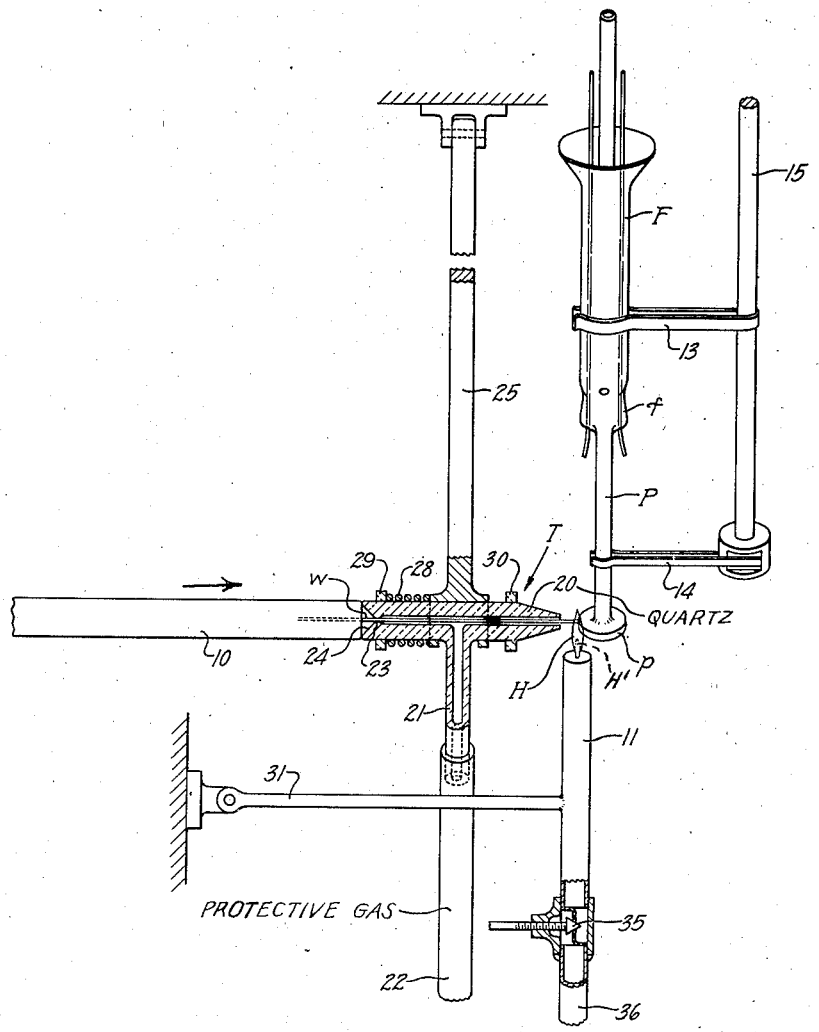

2,431,208

UNITED STATES PATENT OFFICE 2,431,208

SUPPORT WIRE INSERTING APPARATUS

Joseph E. Stone, South Euclid, and Elliot Q. Adams, Cleveland Heights, Ohio, assignors to General Electric Company, a corporation of New York Application February 19, 1943, Serial No. 476,400

3 Claims. (Cl. 49—1)

This invention relates to securing one part to another by heating and softening at least one of the parts, and especially to fastening or "sealing" a metal part such as a wire into a part or body of thermoplastic material, such as a vitreous rod, button, or bead. The invention is concerned with preventing oxidation at the joint, and particularly oxidation of a metallic or other slender part that is embedded in a more massive thermoplastic part. The invention is hereinafter explained with reference to sealing a metal mount wire of highly oxidizable metal (like tungsten or molybdenum) into a glass part of the mount of an incandescent metal filament lamp such as a tungsten lamp, or of an electric discharge lamp having a filamentary wire cathode.

The attachment of the metallic mount part to the thermoplastic vitreous part is generally made by heating the vitreous part to incipient fusion and pressing the metal part into the softened material, so that when the latter cools, the metal part is embedded and securely fixed or sealed into it. This heating is generally done by playing flame(s) on the vitreous part. Very commonly, the metal part is also highly heated, which may result in heavily oxidizing or burning it; and this is especially liable to happen in the case of wires of tungsten metal. Such oxidation not only weakens the metal part at and adjacent the fused joint, but may also tend to impair the adhesion of the vitreous material to the metal, resulting in a weak joint, or even preventing the formation of a joint.

We have found that such difficulties of prior practice can be overcome by a novel method of making the fused joints or seals between metal mount parts and thermoplastic parts, as explained hereinafter. Various features and advantages of the invention will become apparent from the description of a species or form of embodiment, and from the drawings.

The drawing affords a tilted and somewhat diagrammatic view of apparatus for applying the invention in connection with the sealing of a wire into a vitreous mount part, one portion of this apparatus being shown in section, and another partly broken away.

In the drawing, wire-feeding and holding mechanism of any known or suitable type is diagrammatically represented by a member 10 that is movable longitudinally or endwise toward and away from a vitreous part $p$ into which the wire $w$ is to be fused or sealed. The wire $w$ may consist of a short length suitably held in the end of the member 10. As shown, the part $p$ consists of an enlarged button at the end of a glass pedestal rod extension or arbor P projecting from the lead wire seal-press $f$ of a stem flare F. Means for heating the button $p$ to soften it is represented by a gas burner 11 arranged to play a vertical fuel-gas flame H on or across the side or portion of the button $p$ where the wire $w$ is to be inserted. As here shown, the rod P is upright with the button $p$ at its lower end, and the burner 11 is upright and directs the flame H upward across the horizontal edge of the button $p$. The stem and pedestal F, P may be held and fed to and from their position here shown by any suitable conveyor or turret means, here represented merely by a pair of clamps 13, 14 carried by a movable upright support 15. The wire holding device 10 may be moved forward toward the part $p$ to insert the wire $w$ in its softened material by any suitable means, not shown.

Notwithstanding the oxidizing tendency of the heating flame H and of the surrounding atmosphere, it is possible, according to the present invention, to seal the mount wire $w$ into the part $p$ without risk of damage and without enclosing the apparatus in a protective chamber, by locally surrounding the wire $w$ with an envelope of protective gas in the zone of heat adjacent the part $p$. For this purpose, any gas of inert or reducing character may be used, such, for example, as nitrogen, hydrogen, or the reducing but unexplosive mixture of nitrogen with some 7 to 15 per cent of hydrogen that is commonly known in the incandescent lamp art as "forming gas." As shown, a gas supply tube 20 is arranged to blow a jet of the protective gas toward the heated part $p$ around the wire $w$. In the present instance, the tube 20 surrounds the wire $w$ throughout most of the interval between the wire-holding device 10 and the part $p$, and serves as a guide for the wire, besides extending somewhat into the flame H and thus protecting the wire directly. It is shown with a lateral branch 21 having a flexible pipe connection 22 through which forming gas is supplied from any suitable source (not shown), such as a pressure tank with a reducing valve. The tube 20 may be of any suitably refractory material, though fused quartz or quartz glass is at present preferred, because it combines low heat conduction with the refractory characteristics of high fusion point and immunity to oxidation. The nozzle end of the tube T has an opening of sufficient size to jet the forming gas across through the flame H as a protecting skin or envelope around the wire $w$. For a tungsten wire 4 of 20-mil size, a quartz tube 20 of 24 mils internal diameter has been found satisfactory. To economize the protective gas, the rear end of the tube 20 may be reduced at 23 to a neck size just sufficient to pass the wire $w$ without objectionable friction; and to facilitate entry of the wire $w$, it may be conically flared at 24.

The gas supply jet device 20 may be fixed in suitable position adjacent where the part $p$ is heated; or it may be movably mounted on a swinging support arm 25, so that it can be shifted out of the way except when the wire $w$ is advanced or projected forward endwise to enter the softened material. As shown, the device 20 is mounted in the end of the arm 25 with limited freedom for sliding movement in an axial direction toward the part $p$ when the device 10 pushes to the right against the rear end of the device 20, being returned to the left by a helical compression spring 28 acting between the part 25 and an abutment ridge or collar 29 on the device 20. A stop ridge or collar 30 on the device 20 limits its return movement by the spring 28.

Provision for shifting the burner 11 out of the way after heating the part $p$ is diagrammatically indicated by a swinging support arm 31 on which it is mounted. Provision for regulating the fuel-gas flame H, and for shortening this flame so that it shall not impinge on the part $p$ to soften it, is indicated by a valve 35 in the gas supply line 36 to the burner 11.

In using the apparatus here illustrated to seal the ends of the wire $w$ into the part $p$, one mode of operation is as follows:

When the portion of the glass part $p$ into which the wire $w$ is to be sealed has been heated and softened sufficiently by the flame H, the wire $w$ is advanced and inserted into the soft glass by a movement of the part 10 to the right. During this operation, the jet of forming gas from the device 20 surrounds the wire $w$ and protects it from oxidation, even in the midst of the flame H. Indeed, the flame H may be removed as the wire $w$ nears or reaches the softened glass $p$, which is thus straightway allowed to cool and solidify around the cooling wire while the flow of forming gas envelops both parts at and near the fused joint, protecting them from oxidation and at the same time helping to cool them quickly. One way of effectively removing the flame H for this purpose is by a bodily shift of the burner 11, as suggested by the swinging arm 31; another way is to greatly reduce the fuel-gas flow to the burner 11, as suggested by the small flame outline H' in dot and dash lines, and by the valve 35 in the gas supply line 36. If desired, the flame H may be both shifted by movement of the burner 11 and shortened by means of the valve 35.

What we claim as new and desire to secure by Letters Patent of the United States is:

1. Apparatus for inserting an end of a metal wire into a vitreous body comprising, in combination, means to support said vitreous body, means for heating and softening a portion of said vitreous body, a tube member arranged to extend longitudinally toward the softened portion of said vitreous body and having a bore slightly larger than the diameter of the wire to accommodate the wire, a gas connection to the bore of said tube member for blowing a sheath of protective gas longitudinally of and around the wire toward said vitreous body, and means for advancing the tube member and wire toward said vitreous body.

2. Apparatus as set forth in claim 1 wherein the tube member is made of quartz.

3. Apparatus for inserting an end of a metal wire into a vitreous body comprising, in combination, means to support said vitreous body, means for heating and softening a portion of said vitreous body, a jet member arranged to extend longitudinally toward the softened portion of said vitreous body and having a bore slightly larger than the diameter of the wire to accommodate the wire, a gas connection to the bore of said jet member for blowing a sheath of protective gas longitudinally of and around the wire toward said vitreous body, and means for effecting relative movement between said jet member and said vitreous body toward each other to embed an end of the said wire in said vitreous body.

JOSEPH E. STONE.
ELLIOT Q. ADAMS.

REFERENCES CITED

The following references are of record in the file of this patent:

UNITED STATES PATENTS

| Number | Name | Date |
|---|---|---|
| 640,419 | Schott | Jan. 2, 1900 |
| 1,547,748 | Grogan | July 28, 1925 |
| 919,851 | Graybill | Apr. 27, 1909 |
| 1,977,638 | Knox | Oct. 23, 1934 |
| 1,478,859 | Ingold | Dec. 25, 1923 |
| 2,273,437 | Dunn | Feb. 17, 1942 |
| 2,215,641 | Freeman | Sept. 24, 1940 |
| 2,237,186 | Malloy | Apr. 1, 1941 |
| 2,273,439 | Freeman | Feb. 17, 1942 |
| 1,046,724 | Beadle | Dec. 10, 1912 |